United States Patent
Harayama

(10) Patent No.: US 11,618,223 B2
(45) Date of Patent: Apr. 4, 2023

(54) SHAPING METHOD, SLICE DATA GENERATING METHOD, SHAPING DEVICE, AND SLICE DATA GENERATING DEVICE

(71) Applicant: MIMAKI ENGINEERING CO., LTD., Nagano (JP)

(72) Inventor: Kenji Harayama, Nagano (TW)

(73) Assignee: MIMAKI ENGINEERING CO., LTD., Nagano (JP)

( * ) Notice: Subject to any disclaimer, the term of this patent is extended or adjusted under 35 U.S.C. 154(b) by 778 days.

(21) Appl. No.: 16/404,763

(22) Filed: May 7, 2019

(65) Prior Publication Data

US 2019/0351626 A1    Nov. 21, 2019

(30) Foreign Application Priority Data

May 17, 2018    (JP) .............................. JP2018-095706

(51) Int. Cl.
  *B29C 67/00*    (2017.01)
  *B29C 64/112*   (2017.01)
  (Continued)

(52) U.S. Cl.
  CPC ........ *B29C 67/0007* (2013.01); *B29C 64/112* (2017.08); *B29C 64/153* (2017.08);
  (Continued)

(58) Field of Classification Search
  CPC . B29C 67/0007; B29C 64/112; B29C 64/153; B29C 64/393; B33Y 10/00; B33Y 50/02
  See application file for complete search history.

(56) References Cited

U.S. PATENT DOCUMENTS

2017/0148182 A1*    5/2017  Yoshida .................... G06T 7/13

FOREIGN PATENT DOCUMENTS

JP    2016215577    12/2016
JP    2017097517     6/2017
(Continued)

OTHER PUBLICATIONS

"Search Report of Europe Counterpart Application", dated Sep. 25, 2019, p. 1-p. 10.

(Continued)

*Primary Examiner* — Larry W Thrower
(74) *Attorney, Agent, or Firm* — JCIPRNET

(57) ABSTRACT

A shaping method is provided and includes: generating a slice data indicating a cross-section of a shaped object based on a shaped object data, and shaping the shaped object. In a shaped object data preparing step, the shaped object data including multiple pieces of part data is prepared. Each piece of the part data is data indicating at least an outer surface shape of a portion indicated by the part data and a color to be colored on an outer surface. In the slice data generating step, the slice data indicating a cross-section of the shaped object is generated by setting the color of each position of the cross-section corresponding to a portion indicated by each piece of the part data, and a color of an interior of the portion indicated by each piece of the part data is set based on a color set for the outer surface.

13 Claims, 7 Drawing Sheets

(51) Int. Cl.
*B29C 64/153* (2017.01)
*B29C 64/393* (2017.01)
*B33Y 10/00* (2015.01)
*B33Y 50/02* (2015.01)

(52) U.S. Cl.
CPC ............ *B29C 64/393* (2017.08); *B33Y 10/00* (2014.12); *B33Y 50/02* (2014.12)

(56) References Cited

FOREIGN PATENT DOCUMENTS

| WO | 2016175831 | 11/2016 |
| WO | 2017204094 | 11/2017 |

OTHER PUBLICATIONS

Office Action of Japan Counterpart Application, with English translation thereof, dated Sep. 28, 2021, pp. 1-10.

* cited by examiner

SHAPING METHOD, SLICE DATA GENERATING METHOD, SHAPING DEVICE, AND SLICE DATA GENERATING DEVICE

CROSS REFERENCE TO RELATED APPLICATIONS

This application claims the priority benefit of Japanese Patent Application No. 2018-095706, filed on May 17, 2018. The entirety of the above-mentioned patent application is hereby incorporated by reference herein and made a part of this specification.

TECHNICAL FIELD

The present disclosure relates to a shaping method, a slice data generating method, a shaping device, and a slice data generating device.

DESCRIPTION OF THE BACKGROUND ART

Conventionally, a shaping device (3D printer) that shapes a shaped object using an inkjet head is known. In such a shaping device, for example, the shaped object is shaped through the layered shaping method by overlapping a plurality of layers of ink formed by the inkjet head. Furthermore, with regards to a method of shaping a colored shaped object, for example, a method of shaping a shaped object in which the surface is colored by forming a surface of the shaped object with a coloring material, and the like are conventionally known. Furthermore, in recent years, with regards to the manner of shaping the colored shaped object, proposal has been made to color even the interior of the shaped object by mixing a white material and a decorating material to form the interior of the shaped object (e.g., see Patent Literature 1).

Patent Literature 1: Japanese Unexamined Patent Application Publication No. 2016-215577

SUMMARY

In a case of coloring the interior of a shaped object, for example, it is conceivable to color the interior of the shaped object in the same manner as the actual interior of the object represented by the shaped object. In this case, it is necessary to perform coloring on the interior of the shaped object with different colors depending on the region. However, 3D data, which is data indicating a stereoscopic structure, usually does not show the detailed structure of the interior, and shows only the shape and the like of the surface. For this reason, for example, when using widely used 3D data of a general format, it is considered difficult to specify the color and the like of each color of the interior of the shaped object.

On the other hand, if 3D data of a special format, for example, is used, even the color and the like at each position in the interior can be specified for the stereoscopic structure. However, in this case, it is necessary to generate 3D data indicating the shaped object by a method greatly different from the conventional method, and the work to prepare the 3D data may be very troublesome. Furthermore, in this case, specifying all colors and the like at each positions of the interior of the shaped object may greatly increase the data amount of the 3D data. In addition, in this case, it is also conceivable that generation of the 3D data indicating the shaped object may not be performed by a known 3D CAD or the like which is widely used.

Therefore, conventionally, it has been desired to prepare the 3D data by a more appropriate method and to carry out shaping through a more appropriate method in the case of coloring the interior of the shaped object. The present disclosure thus provides a shaping method, a slice data generating method, a shaping device, and a slice data generating device capable of solving the above problems.

The inventor of the present application conducted extensive research on a method of more appropriately performing shaping when coloring the interior of a shaped object and the like. Then considering the shaped object to be shaped as a plurality of parts, consideration has been made to represent shaped object data, which is data indicating a shaped object, by a set of pieces of part data indicating respective parts. In this case, consideration has been made to use data specifying an outer surface shape and a color of the outer surface of each part for each piece of part data. In this case, it is possible to use, for example, widely used 3D data of a general format as each piece of part data and shaped object data made up of pieces of part data. Thus, for example, a state of the interior of the shaped object can be appropriately indicated while preventing the data amount from becoming excessively large. In addition, in this case, for example, it is also possible to generate the 3D data using 3D CAD or the like, which is widely used.

Furthermore, when shaping a shaped object, for example, slice data indicating a cross-section of the shaped object is generated based on the shaped object data, and the shaping operation is executed based on the slice data. Through further intensive research, the inventor of the present application considered setting the color of the interior of a portion indicated by each piece of part data based on a color set with respect to an outer surface at the time of generating the slice data when using such shaped object data. With this configuration, the slice data can be appropriately generated based on the shaped object data composed of the part data as described above. The shaping of the shaped object thus can be appropriately executed. Furthermore, the inventor of the present application found features necessary for obtaining such effects and contrived the present disclosure.

In order to solve the above-mentioned problem, the present disclosure provides a shaping method for shaping a stereoscopic shaped object, the method including a shaped object data preparing step of preparing shaped object data which is data indicating the shaped object to be shaped; a slice data generating step of generating slice data which is data indicating a cross-section of the shaped object based on the shaped object data, a plurality of pieces of slice data indicating cross-sections of the shaped object at different positions being generated; and a shaping step of shaping the shaped object based on the plurality of pieces of slice data; where in the shaped object data preparing step, the shaped object data including a plurality of pieces of part data, each of which is data indicating a part of the shaped object, is prepared; a portion indicated by the part data of at least one part of the plurality of pieces of part data included in the shaped object data is a portion surrounding a periphery of a portion indicated by another piece of part data; each piece of the part data is data indicating at least an outer surface shape of a portion indicated by the part data and a color to be colored on the outer surface of the portion; and in the slice data generating step, the slice data indicating a cross-section of the shaped object is generated by setting the color of each position of the cross-section corresponding to a portion indicated by each piece of the part data, and a color of an interior of the portion indicated by each piece of the part data is set based on a color set for the outer surface.

With such a configuration, for example, the color of the interior of the shaped object can be appropriately set in the shaped object data. Furthermore, the slice data can be appropriately generated based on the shaped object data, and the shaping operation can be appropriately executed based on the slice data. Therefore, with such a configuration, the shaped object in which the interior is colored can be appropriately shaped.

Furthermore, in this configuration, for example, the shaping material of a plurality of colors different from each other is ejected based on the slice data from a head portion that ejects the shaping material of a plurality of colors in the shaping step. Furthermore, for example, a shaped object in which at least one part of the interior of the portion indicated by the part data is colored is thus shaped. With such a configuration, for example, the shaping of the shaped object in which the interior is colored can be more appropriately executed.

Furthermore, in this configuration, in the slice data generating step, a normal direction (normal vector) at each position on the outer periphery of the cross-section corresponding to the portion indicated by each piece of the part data is calculated. The same color is set to each position along the normal direction for at least the vicinity of the outer periphery of the portion indicated by the part data. In this case, it is conceivable to set the same color to each position along the normal direction for the portion not overlapping another piece of part data on the inner side among the portions indicated by respective pieces of the part data. More specifically, for example, if the part data indicating a portion surrounding the portion indicated by the other piece of part data is defined as outer data and the other piece of part data is defined as inner data, it can be considered that the same color is set to each position along the normal direction of the outer data with respect to the portion excluding the portion indicated by the inner data from the portion indicated by the outer data in the slice data generating step. With this configuration, colors can be appropriately set for the interior of the portion corresponding to each piece of part data based on the color set to the outer surface in the part data.

In this case, in the slice data generating step, for example, the slice data is generated so that a shaping material is filled without gaps in the shaping step to between the portions indicated by respective pieces of part data by setting the color of the interior of the portion indicated by the pieces of part data. In this case, the portion between the portions indicated by respective pieces of part data is, for example, a region sandwiched by the outer surface shapes indicated by the respective pieces of part data. With this configuration, the slice data can be appropriately generated without forming unnecessary gaps or the like between the portions indicated by the pieces of part data. Furthermore, the shaped object thus can be appropriately shaped without forming unnecessary gaps or the like in the interior in the shaping step.

Furthermore, it is conceivable that in the slice data generating step, a plurality of pieces of part data included in the shaped object data are, more specifically, sequentially selected, for example, and a color of each position of a cross-section corresponding to a portion indicated by the selected part data is set. In this case, sequentially selecting a plurality of pieces of part data means, for example, sequentially selecting during an operation of generating one piece of slice data. The order of selecting the part data, for example, may be set in advance at the time of generating the shaped object data. In this case, for example, it is conceivable to set the order in units of layers using the shaped object data in the data format composed of a plurality of layers.

More specifically, in this case, the layer corresponds to, for example, a configuration corresponding to mutually independent spaces that logically overlap each other at the same position in the 3D space. Furthermore, the layer, for example, can be considered as a configuration same as or similar to a general layer (3D layer) defined by software for editing 3D data (e.g., software of 3D CAD) or the like. In this configuration, for example, it is conceivable to use a plurality of layers ordered in advance in software or the like for forming the shaped object data. Furthermore, for example, it is conceivable to associate each piece of part data with one of the layers by including a portion corresponding to one piece of part data in one layer. In this case, in the slice data generating step, each of the plurality of layers is selected in an order set in advance, and the color of each position of the cross-section corresponding to the portion indicated by the part data associated with the selected layer is set. With this configuration, for example, each piece of part data can be appropriately selected in the order set by associating with layers at the time of generating the shaped object data or the like.

Furthermore, in this case, the plurality of pieces of part data are preferably selected in order from the part data corresponding to a portion on the outer side of the shaped object. More specifically, in this case, for example, it is conceivable to select the part data indicating a portion surrounding the periphery of a portion indicated by another piece of part data before the other piece of part data. With such a configuration, for example, each piece of part data can be appropriately selected according to a certain rule. In addition, in this case, the order of selecting the parts may not necessarily be set in advance, and the order may be determined in the slice data generating step based on the positional relationship of the portions indicated by the respective pieces of part data.

Further, at the time of generating the slice data, it is conceivable to perform the color overwriting processing or the like on the color set based on the previously selected part data based on the part data to be selected later. More specifically, regarding outer data indicating a portion surrounding a periphery of a portion indicated by another piece of part data and inner data which is the other piece of part data, when setting the color of the interior of the portion indicated by the outer data in the slice data generating step, the color is also set to the portion indicated by the inner data based on the color set to the outer surface of the portion indicated by the outer data. In this case, thereafter, in the case of setting the color of the interior of the portion indicated by the inner data, the overwriting process of changing the color set at the time of setting the color of the interior of the portion indicated by the outer data is performed on the color of the interior to set the color based on the color set to the outer surface of the portion indicated by the inner data. With such a configuration, for example, the setting of the color based on each piece of part data can be appropriately carried out.

Furthermore, in this configuration, for example, data with which color setting has not been performed on the interior of the portion indicated by the part data can be suitably used as the part data. More specifically, for example, it is conceivable to use data or the like in which only the shape and color of the outer surface are specified as the part data. With such a configuration, for example, the state of each part of the shaped object can be appropriately specified by part data having a small data amount. Furthermore, in the part data, it is conceivable to set the color to be applied to the outer surface by, for example, texture mapping. With such a configuration, for example, in the part data, the color of the outer surface can be appropriately set.

Furthermore, the shaping method described above, for example, can be regarded as a manufacturing method for a shaped object. Moreover, as a configuration of the present disclosure, it is also conceivable to use a slice data generating method, a shaping device, a slice data generating device and the like having the same features as above. In these cases as well, for example, effects similar to those of the above can be obtained.

According to the present disclosure, the shaping can be more appropriately performed, for example, when coloring the interior of the shaped object.

BRIEF DESCRIPTION OF THE DRAWINGS

FIG. 1A shows an example of a configuration of the shaping system 10. FIG. 1B shows one example of a configuration of a main part of a shaping device 12. FIG. 1C shows an example of the configuration of a head portion 102.

FIG. 2A is a view explaining a format of shaped object data. FIG. 2B shows an example of slice data 400 generated in the present example.

FIG. 3A shows an example on the manner of setting colors in the present example. FIG. 3B shows another example on the manner of setting colors.

FIG. 4A shows an example of an operation of setting colors to regions 402a. FIG. 4B shows a modified example of the operation of setting colors to the region 402a. FIG. 4C shows an example of the operation of setting colors to regions 402b.

DESCRIPTION OF EMBODIMENTS

Figure 1A:
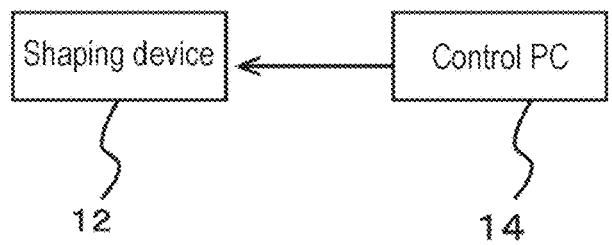
FIGS. 1A to 1C are views showing one example of a shaping system 10 in accordance with one embodiment of the present disclosure.
Figure 1B:
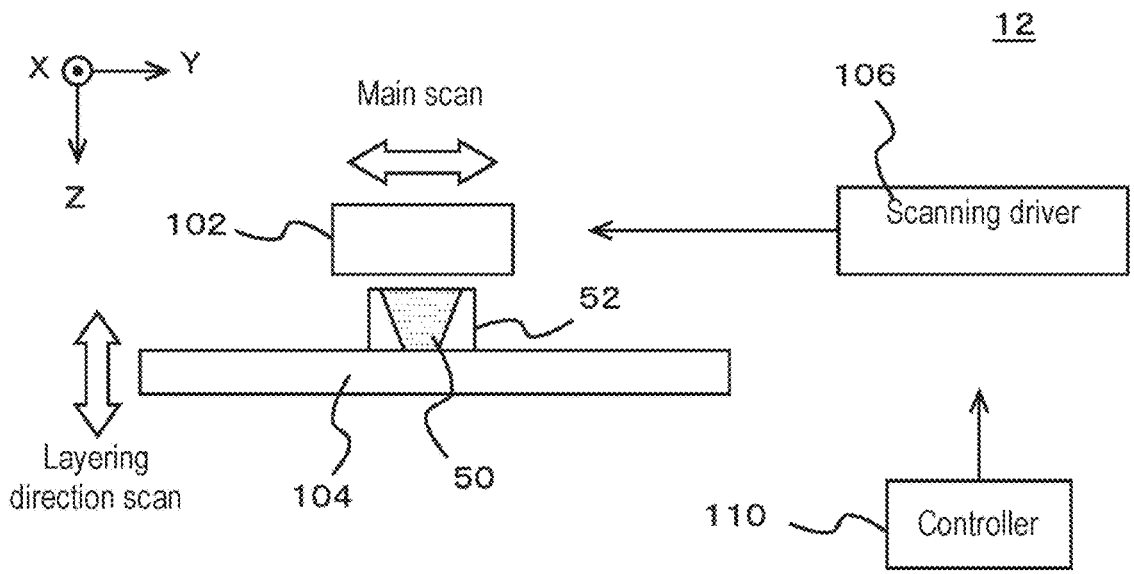
Figure 1C:
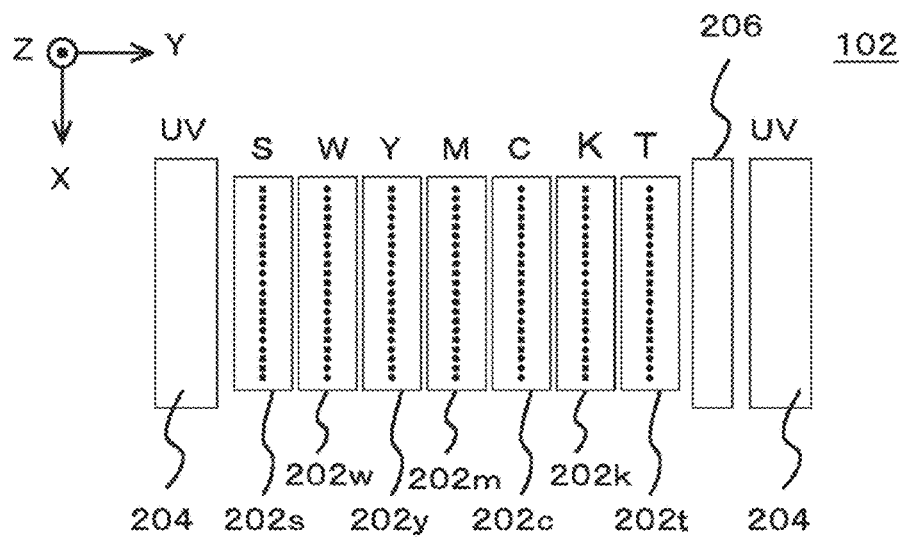

Hereinafter, an embodiment according to the present disclosure will be described with reference to the drawings. FIGS. 1A to 1C show one example of a shaping system 10 according to one embodiment of the present disclosure. FIG. 1A shows an example of a configuration of the shaping system 10. In the present example, the shaping system 10 is a shaping system for shaping a stereoscopic shaped object, and includes a shaping device 12 and a control PC 14.

The shaping device 12 is a device that executes shaping of a shaped object, and shapes a shaped object according to the control by the control PC 14. More specifically, the shaping device 12 is a full-color shaping device capable of shaping a shaped object colored in full color, and receives data indicating a shaped object to be shaped from the control PC 14, and shapes the shaped object based on such data. Furthermore, in the present example, the shaping device 12 shapes a shaped object (shaped object subjected to bulk color coloring) which is colored not only on the surface where the hue can be visually recognized from the outside but also the interior. In this case, a high quality shaped object can be shaped by coloring the entire interior of the shaped object so as to decorate even the center of the shaped object furthest from the surface of the shaped object. The manner of shaping such a shaped object will be described in detail below.

Furthermore, in the present example, the shaping device 12 receives shaped object data indicating the entire shaped object to be shaped as the data indicating the shaped object. Moreover, the shaping device 12 generates a plurality of pieces of slice data indicating cross-sections of the shaped object at different positions from each other in a layering direction set in advance based on the shaped object data. Then, each layer forming the shaped object is formed based on each slice data.

The control PC 14 is a computer (host PC) that controls the operation of the shaping device 12. The control PC 14 manages the shaping operation by the shaping device 12, for example, by managing the job of shaping to be executed by the shaping device 12 and providing the shaped object data to the shaping device 12.

As described above, in the present example, generation of slice data is performed in the shaping device 12. However, in a modified example of the configuration of the shaping system 10, for example, slice data may be generated in the control PC 14. In this case, the control PC 14 controls the operation of the shaping device 12 by providing the slice data to the shaping device 12. Furthermore, as described above, in the present example, the shaping system 10 is configured by a plurality of devices, the shaping device 12 and the control PC 14. However, in a modified example of the shaping system 10, the shaping system 10 may be configured by a single device. In this case, for example, it is conceivable to configure the shaping system 10 with one shaping device 12 including the function of the control PC 14.

Next, a specific configuration of the shaping device 12 will be described. FIG. 1B shows one example of a configuration of a main part of a shaping device 12. In the present example, the shaping device 12 is a shaping device for shaping a stereoscopic shaped object 50, and includes a head portion 102, a shaping table 104, a scanning driver 106, and a controller 110.

Other than the points described below, the shaping device 12 may have a configuration same as or similar to a known shaping device. More specifically, other than the points described below, the shaping device 12 may have a configuration same as or similar to, for example, a known shaping device that carries out shaping by ejecting a droplet serving as the material of a shaped object 50 using an inkjet head. Furthermore, other than the illustrated configuration, the shaping device 12 may also include, for example, various types of configurations necessary for shaping, and the like of the shaped object 50. Moreover, in the present example, the shaping device 12 is a shaping device (3D printer) that shapes a stereoscopic shaped object 50 through a layered shaping method. In this case, the layered shaping method is, for example, a method of shaping the shaped object 50 by layering a plurality of layers. The shaped object 50 is, for example, a stereoscopic three-dimensional structural object. Furthermore, in the present example, the shaping operation performed by the shaping device 12 is an example of the operation at the shaping stage.

The head portion 102 is a part that ejects the material of the shaped object 50. Furthermore, in the present example, ink is used as the material of the shaped object 50. In this case, the ink is, for example, a functional liquid. Furthermore, in this example, the ink can also be considered as, for example, a liquid to be ejected from an inkjet head. More specifically, the head portion 102 ejects ink that cures according to predetermined conditions from a plurality of inkjet heads as a material of the shaped object 50. Then, the respective layers forming the shaped object 50 are overlapped and formed by curing the ink after landing to shape a shaped object through the layered shaping method. Moreover, in the present example, an ultraviolet-curable ink (UV ink) that cures from a liquid state by irradiation of ultraviolet light is used as the ink. Furthermore, the head portion 102 further ejects a material of a support layer 52 in addition to the material of the shaped object 50. The head portion 102 thereby forms the support layer 52 at a periphery of the shaped object 50 as necessary. The support layer 52 is, for example, a layered structural object that supports the shaped object 50 by surrounding the outer periphery of the shaped object 50 being shaped. The support layer 52 is formed as necessary at the time of shaping of the shaped object 50 and removed after the completion of the shaping.

The shaping table 104 is a table-shaped member that supports the shaped object 50 being shaped, and is disposed at a position facing the inkjet head in the head portion 102, and has the shaped object 50 being shaped placed on the upper surface thereof. Furthermore, in the present example, the shaping table 104 has a configuration in which at least the upper surface is movable in a layering direction (Z direction in the figure), and moves at least the upper surface in accordance with the progress of the shaping of the shaped object 50 by being driven by the scanning driver 106. In this case, the layering direction means, for example, a direction in which the shaping material is layered in the layered shaping method. More specifically, in the present example, the layering direction is a direction orthogonal to the main scanning direction (Y direction in the figure) and the sub scanning direction (X direction in the figure) set in advance in the shaping device 12.

The scanning driver 106 is a driver that causes the head portion 102 to perform a scanning operation of relatively moving with respect to the shaped object 50 being shaped. In this case, "relatively moving with respect to the shaped object 50 being shaped" means, for example, relatively moving with respect to the shaping table 104. Causing the head portion 102 to perform a scanning operation means, for example, causing the inkjet head of the head portion 102 to perform a scanning operation. Furthermore, in the present example, the scanning driver 106 causes the head portion 102 to perform main scan (Y scan), sub scan (X scan), and layering direction scan (Z scan).

The main scan is, for example, an operation of ejecting ink while moving in the main scanning direction relatively to the shaped object 50 being shaped. In this example, the scanning driver 106 causes the head portion 102 to perform the main scan by fixing the position of the shaping table 104 in the main scanning direction and moving the head portion 102 side. Furthermore, for example, the scanning driver 106 may move the shaped object 50 side by fixing the position of the head portion 102 in the main scanning direction and moving, for example, the shaping table 104. The sub scan means, for example, an operation of relatively moving with respect to the shaped object 50 being shaped in the sub scanning direction orthogonal to the main scanning direction. More specifically, the sub scan is, for example, an operation of relatively moving with respect to the shaping table 104 in the sub scanning direction by a feed amount set in advance. In the present example, the scanning driver 106 causes the head portion 102 to perform sub scan by fixing the position of the head portion 102 in the sub scanning direction and moving the shaping table 104 between the operations of main scan. Furthermore, the scanning driver 106 may cause the head portion 102 to perform sub scan by fixing the position of the shaping table 104 in the sub scanning direction and moving the head portion 102.

The layering direction scan is, for example, an operation of moving the head portion 102 in the layering direction relatively with respect to the shaped object 50 being shaped. Furthermore, the scanning driver 106 adjusts the relative position of the inkjet head with respect to the shaped object 50 being shaped in the layering direction by causing the head portion 102 to perform the layering direction scan in accordance with the progress of the shaping operation. More specifically, in the layering direction scan of the present example, the scanning driver 106 fixes the position of the head portion 102 in the layering direction and moves the shaping table 104. The scanning driver 106 may fix the position of the shaping table 104 in the layering direction and move the head portion 102.

The controller 110 is, for example, a CPU of the shaping device 12, and controls the shaping operation of the shaped object 50 by controlling each portion of the shaping device 12. Furthermore, in the present example, the controller 110 generates a plurality of pieces of slice data based on the shaped object data received from the control PC 14. In this case, the shaping device 12 including the controller 110 can be considered as also serving as, for example, a slice data generating device. Further, in the present example, the controller 110 controls each portion of the shaping device 12 based on each piece of the generated slice data. In this case, the controller 110 controls the operation of each inkjet head in the head portion 102, for example, to cause each inkjet head to eject ink used for shaping the shaped object. According to the present example, the shaped object 50 can be appropriately shaped. The operation of generating the slice data from the shaped object data will be described in more detail later.

Now, a configuration of the head portion 102 in the shaping device 12 will be described in more detail. FIG. 1C shows an example of the configuration of a head portion 102. In the present example, the head portion 102 includes a plurality of inkjet heads, a plurality of ultraviolet light sources 204, and a flattening roller 206. As shown in the figure, the plurality of inkjet heads include an inkjet head 202s, an inkjet head 202w, an inkjet head 202y, an inkjet head 202m, an inkjet head 202c, an inkjet head 202k, and an inkjet head 202t. The plurality of inkjet heads are, for example, arranged side by side in the main scanning direction with their positions in the sub scanning direction aligned. Furthermore, each inkjet head includes a nozzle row, in which a plurality of nozzles are arranged in a predetermined nozzle row direction, on a surface facing the shaping table 104. Furthermore, in the present example, the nozzle row direction is a direction parallel to the sub scanning direction.

Among the inkjet heads, the inkjet head 202s is an inkjet head that ejects the material of the support layer 52. For example, a known material for the support layer can be suitably used for the material of the support layer 52. The inkjet head 202w is an inkjet head that ejects white (W color) ink. Furthermore, in the present example, the white ink is an example of an ink having light reflecting property, and reflects the light entering from outside the shaped object 50 in the interior of the shaped object 50 by forming each part of the shaped object 50 together with the color ink for coloring. Thus, in the shaped object 50, the white ink functions as a background in color expression by the subtractive color mixing method.

The inkjet head 202*y*, the inkjet head 202*m*, the inkjet head 202*c*, and the inkjet head 202*k* (hereinafter referred to as the inkjet heads 202*y* to 202*k*) are inkjet heads for coloring that eject color ink for coloring. More specifically, the inkjet head 202*y* ejects ink of yellow color (Y color). The inkjet head 202*m* ejects ink of magenta color (M color). The inkjet head 202*c* ejects ink of cyan color (C color). Furthermore, the inkjet head 202*k* ejects ink of black color (K color). In this case, each color of Y, M, C, and K is an example of process colors used for full color representation by the subtractive color mixing method. Furthermore, in this example, the ink of each color of Y, M, C, and K forms each part of the shaped object 50 together with white ink, thereby coloring each part of the shaped object 50.

The inkjet head 202*t* is an inkjet head that ejects a clear ink. The clear ink is, for example, an ink of clear color which is a colorless transparent color (T). In this example, the clear ink is used, for example, when forming a transparent protective layer on the surface of the shaped object 50. The clear ink may be used for forming other than the protective layer of the shaped object 50, as necessary. More specifically, in this case, for example, consideration is made to using a clear ink to compensate for the total change in the usage amount of ink of each color of Y, M, C, and K caused by a difference in color at the time of forming a portion to be colored in the shaped object 50. Furthermore, in this case, it can be considered that each part of the shaped object 50 is formed using white ink, color ink for coloring, and the clear ink.

Here, as described above, in the present example, the head portion 102 ejects ink from each inkjet head under the control by the controller 110. In addition, the controller 110 controls the operation of each portion of the shaping system 10 based on the slice data. Therefore, the operation of the head portion 102 can be considered as, for example, an operation of ejecting ink of a plurality of colors based on the slice data, or the like.

The plurality of ultraviolet light sources 204 are light sources (UV light sources) for curing the ink, and generate an ultraviolet light for curing the ultraviolet-curable ink. Moreover, in the present example, each of the plurality of ultraviolet light sources 204 is disposed on one end side and the other end side in the main scanning direction in the head portion 102 so as to sandwich the plurality of inkjet heads in between. For example, UV LED (ultraviolet LED) and the like can be suitably used for the ultraviolet light source 204. Furthermore, it is also conceivable to use a metal halide lamp, a mercury lamp, and the like for the ultraviolet light source 204. The flattening roller 206 is a flattening means for flattening the layer of the ink formed during the shaping of the shaped object 50. Furthermore, for example, the flattening roller 206 flattens the layer of ink by coming into contact with a surface of the layer of ink and removing part of the ink before curing at the time of the main scan.

The layer of ink forming the shaped object 50 can be appropriately formed by using the head portion 102 having the above configuration. Furthermore, the shaped object 50 can be appropriately shaped by forming the plurality of layers of inks in an overlapping manner.

Next, the operation of generating the slice data based on the shaped object data will be described in more detail. As described above, in this example, the slice data is data indicating a cross-section of the shaped object 50 to be shaped. Furthermore, the shaping device 12 forms the shaped object 50 in which coloring is performed not only on the surface from which the hue can be visually recognized from the outside, but also on the interior thereof. In this case, data indicating the color of each position in the cross-section of the shaped object 50 including the portion corresponding to the interior of the shaped object 50 is used for the slice data. In this case, the slice data can also be considered as data corresponding to color image data in which a color is given to a portion corresponding to the entire cross-section of the shaped object 50.

In addition, in the present example, the controller 110 of the shaping device 12 generates a plurality of pieces of slice data, each of which indicates a cross-section of each position of the shaped object 50, based on the shaped object data indicating the entire shaped object 50. In this case, data including information on the color of the interior of the shaped object 50 needs to be used as the shaped object data to generate the slice data as described above. Considering this point in the simplest form, for example, it is conceivable to use data reliably expressing the stereoscopic structure of the shaped object 50 to be shaped including the interior thereof (e.g., 3D data in which color is individually specified for each position in a three-dimensional space) or the like for the shaped object data. However, in this case, specifying all the color and the like at each position of the interior of the shaped object 50 may cause the data amount to increase greatly. Furthermore, it becomes necessary to use data of a special format for the shaped object data, and the work to prepare the shaped object data may be very troublesome. In addition, it is also conceivable that generation of the shaped object data cannot be performed with the known 3D CAD or the like. Therefore, in the present example, data of a format that shows the shaped object 50 with smaller data amount is used as the shaped object data rather than the data that reliably expresses the stereoscopic structure of the shaped object 50, and the like.

Figure 2A:
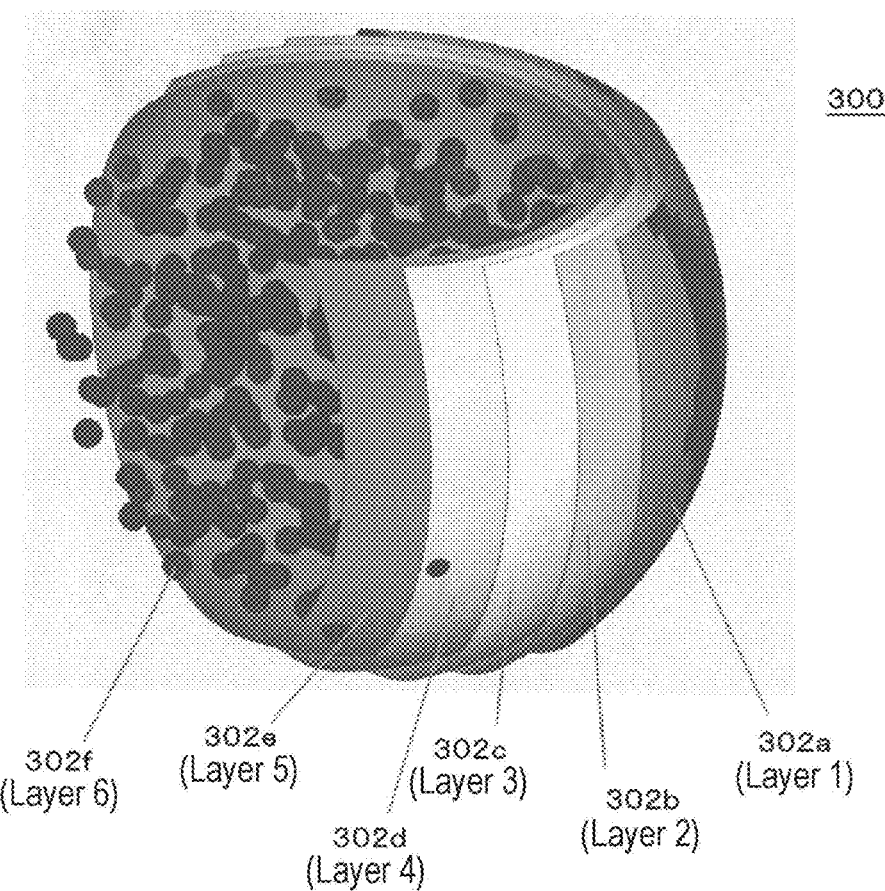
FIGS. 2A and 2B are views explaining shaped object data and slice data is more detail.
Figure 2B:
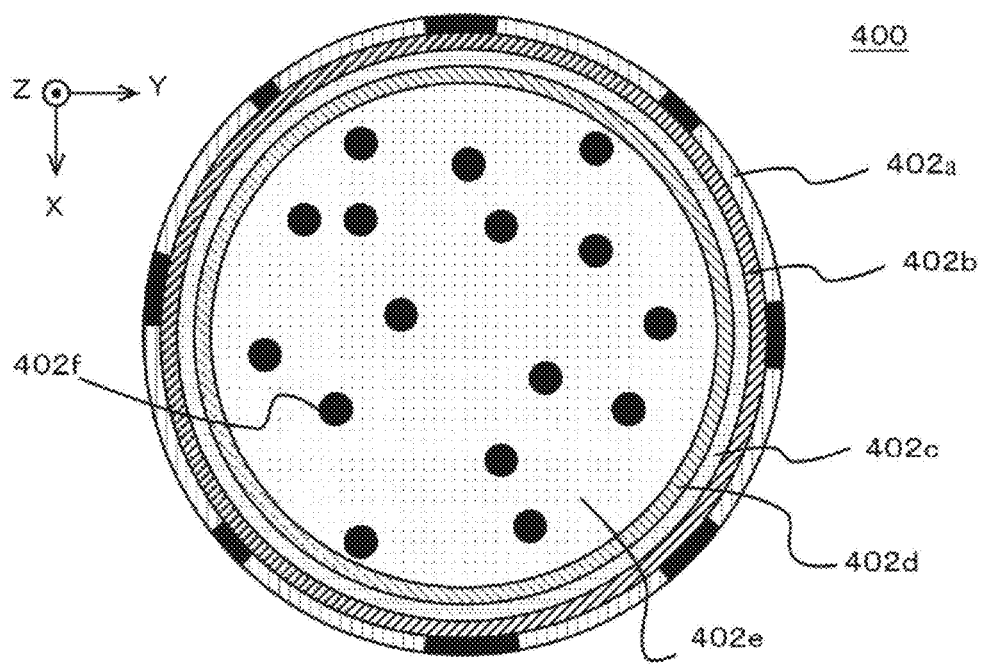

FIGS. 2A and 2B are views explaining the shaped object data and the slice data used in the present example in further detail. FIG. 2A is a view explaining the format of the shaped object data and shows one example of a configuration of the shaped object data being generated using software such as 3D CAD. Furthermore, FIG. 2A can be considered as, for example, an image view showing the configuration of 3D data of shaped object data and the like. More specifically, FIG. 2A schematically shows, in a case of shaping a shaped object expressing watermelon, one example of a configuration of shaped object data 300 corresponding to the shaped object.

It is conceivable that the generation or editing of the shaped object data 300 is performed by a user, for example, in the control PC 14 (see FIGS. 1A to 1C) or another computer or the like using the known 3D CAD software. More specifically, in the present example, the shaped object data 300 is generated or edited using the 3D CAD software having a layer function. In this case, the layer is, for example, a general layer (3D layer) defined by software for editing 3D data (e.g., software of 3D CAD) and the like. The layer can also be considered as, for example, a configuration corresponding to mutually independent spaces that logically overlap at the same position in the 3D space.

In the present example, the operation of generating the shaped object data 300 is one example of an operation of shaped object data preparation stage. Furthermore, in FIG. 2A, the illustration is made in a gray-scaled image for the sake of convenience of illustration. However, in the actual shaped object data 300, the color in full color is set in accordance with the color of the shaped object to be shaped.

In this figure, in order to show that colors are set even to the interior of the shaped object corresponding to the interior of the watermelon, an example of a configuration of the shaped object data 300 is illustrated in a state in which one part is cut so that the content is visible. However, it is conceivable to use data indicating a shaped object in a state in which contents cannot be visually recognized directly from the outside, like the actual watermelon, for example, for the actual shaped object data 300.

Furthermore, in the present example, the shaped object indicated by the shaped object data 300 is formed by a plurality of parts 302a to 302f as shown in the figure. In this case, each of the plurality of parts 302a to 302f is a portion showing one part of the shaped object. More specifically, in the case shown in the figure, the part 302a shows the surface portion of the watermelon. The part 302b shows the portion on the inner side of the portion indicated by the part 302a. The part 302c shows the portion on the inner side of the portion indicated by the part 302b. The part 302d shows a portion further on the inner side of the portion indicated by the part 302c. The part 302e shows a portion further on the inner side of the portion indicated by the part 302d. Furthermore, the part 302f shows a portion corresponding to the seed of the watermelon on the inner side of the portion indicated by the part 302e.

Furthermore, in the shaped object data 300 of the present example, each of the parts 302a to 302f is indicated by part data corresponding to each part. In this case, the part data is data indicating one part of the shaped object, and at least shows the outer surface shape of the part and the color (color of the outer surface) colored with respect to the outer surface of the portion corresponding to the part. In this case, regarding the shape of the part, indicating the outer surface shape means, for example, specifying the shape of the outer surface by the shape of the curved surface having no thickness or no meaning in thickness. More specifically, in the part data of the present example, only the color of the outer surface is indicated for colors. In this case, indicating only the color of the outer surface means, for example, that the color is not set for the interior of the part. Such part data can also be considered as, for example, data or the like in which only the shape and color of the outer surface of the part are specified.

Furthermore, in the part data of the present example, the color to be colored with respect to the outer surface is set, for example, by texture mapping. The texture mapping is, for example, to set the texture (color etc.) at each position on the surface of the stereoscopic shape so as to paste a texture to the surface of the stereoscopic shape. Furthermore, texture is, for example, a pattern to be pasted to a surface of a three-dimensional object in computer graphics. In this case, the color is set to each position on the outer surface of the part by pasting a texture (e.g., texture indicating color image) indicating a color to be set for each position of the part. With such a configuration, for example, in the part data, the color of the outer surface can be appropriately set.

Furthermore, more specifically, in the illustrated case, for the part data corresponding to each of the parts 302a to 302f, the color of each part of the watermelon is set as the color of the outer surface according to the position of each part. For example, in the case of part data indicating the part 302a corresponding to the outside portion of the watermelon, the color of the surface of the part is set by a texture indicating the outside pattern of the watermelon in which black stripes are included in the green background, with respect to each position of the outer surface. In the part data indicating each of the parts 302b to 302d corresponding to the portion at each position between the surface and the flesh of the watermelon, the color of the surface of the part is set by a texture indicating the color of each position in the watermelon. In this case, it is conceivable to set, for example, a yellowish-green color, which is more yellowish than green, in the surface of the watermelon to the surface of the part 302b. Furthermore, it is conceivable to set, for example, a light-yellow color or a color close to such color to the surface of the part 302c. It is also conceivable to set, for example, an orange color or a color close to such color to the surface of the part 302d. Furthermore, in the part data indicating the part 302e corresponding to the flesh portion of the watermelon, the color of the surface of the part is set by a texture indicating a red color which is the color of the flesh of the watermelon. Moreover, in the part data indicating the part 302f corresponding to the seed of the watermelon, the color of the surface of the part is set by a texture indicating a black color, which is the color of the seed.

Here, when specifying the shape and color of the outer surface of the corresponding part as in the part data of the present example, each part can be appropriately expressed using the known 3D CAD or the like without using the data of a special format or the like. More specifically, in this example, each piece of part data is generated in association with each layer. In this case, generating each data in association with each layer means, for example, including a portion corresponding to one piece of part data in one layer. Furthermore, in this case, each piece of part data is associated with one of the layers. In such a configuration, for example, a state of each part of the shaped object can be appropriately specified by part data having a small data amount. Furthermore, in this case, the shaped object data including a plurality of pieces of part data can be appropriately generated by using, for example, the known 3D CAD software or the like without using the data of a special format or the like. Therefore, according to the present example, for example, the shaped object data indicating a shaped object can be appropriately generated in a case of shaping a shaped object in which the interior is colored.

As described above, in the present example, the slice data is generated based on the shaped object data. In this case, it is sometimes preferable to use a widely used general-purpose format instead of, for example, a format dedicated to specific software for the format of the shaped object data. Thus, for example, data of STL format or the like can be suitably used for the shaped object data. In this case, for example, data shown in FIG. 2A may be output in the STL format to generate the shaped object data during generation of data in the 3D CAD or the like. Data in a format dedicated to specific software may be used as the shaped object data depending on the configuration of the shaping system 10 (see FIGS. 1A to 1C).

Furthermore, as described above, in the present example, data indicating the color of each position of the cross-section of the shaped object including the portion corresponding to the interior of the shaped object is used as the slice data. In this case, the color also needs to be set to a portion corresponding to the interior of each part at the time of generating the slice data. More specifically, in this case, for example, the color of the interior of the portion indicated by each piece of part data is set at the time of generating the slice data. Thus, the slice data is generated so that ink is filled without gaps to between portions indicated by the respective pieces of part data at the time of executing shaping in the shaping device 12.

FIG. 2B is a view showing one example of slice data 400 generated in the present example, and shows one example of a configuration of the slice data at one cross-sectional position for a case in which the slice data is generated based on the shaped object data having the configuration shown in FIG. 2A. In the illustrated case, the slice data 400 is composed of a plurality of areas 402a to 402f. Each of the plurality of regions 402a to 402f is a portion indicated by the part data in the shaped object data 300 and corresponds to each of the parts 302a to 302f shown in FIG. 2A. Furthermore, as can be seen from the figure, in the present example, the slice data is generated without forming extra gaps or the like between each of the regions 402a to 402f. With such a configuration, for example, the shaped object can be appropriately shaped without forming extra gaps or the like in the interior when executing shaping in the shaping device 12.

Next, the operation and the like for generating the slice data in the present example will be described in more detail. As described above, in the present example, data composed of a plurality of pieces of part data is used as the shaped object data. Furthermore, for the part data, data indicating the shape of the part and the color of the outer surface is used. On the other hand, for the slice data generated based on the shaped object data, data indicating the color of each position of the cross-section of the shaped object including the portion corresponding to the interior of the shaped object is used. In this case, at the time of generating the slice data, the color needs to be set with respect to a region corresponding to the interior of the part for which the color is not set in the part data.

On the other hand, in the present example, the color is set with respect to each position in the region corresponding to the interior of the part by setting the color of the inner side of the part in accordance with the color of the outer surface of the part with respect to the region corresponding to each piece of part data. Furthermore, in this case, the respective pieces of part data are sequentially selected in order with respect to the plurality of pieces of part data included in the shaped object data, and the color is set with respect to the region corresponding to the selected part data. The slice data indicating the color of each position in the cross-section of the shaped object is thereby generated.

More specifically, in the present example, when setting colors to regions corresponding to the interior of the part, the color is set with respect to each position included in the slice data at the time of generating slice data corresponding to each cross-sectional position in the shaped object. Furthermore, in this case, with respect to each piece of part data selected in order, the normal direction (normal vector) at each position of the outer periphery of the cross-section corresponding to the portion indicated by the part data (hereinafter simply referred to as the outer periphery of the part data) is calculated. The same color is set to each position along the normal direction for at least the vicinity of the outer periphery of the portion indicated by the part data. In this case, for example, the color is set to a region corresponding to the interior of each part by the method explained below with reference to FIGS. 3A and 3B.

Figure 3A:
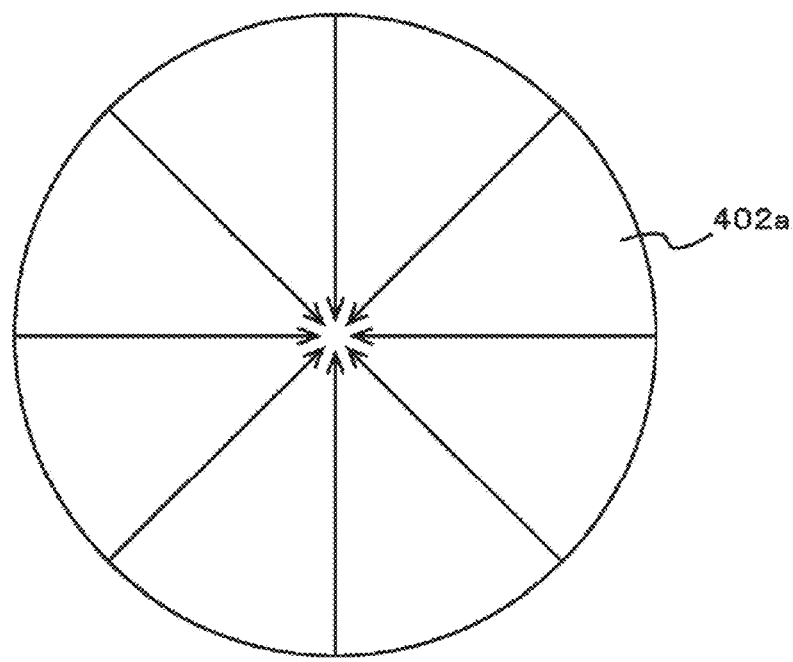
FIGS. 3A and 3B is a view showing an example on the manner of setting colors to regions corresponding to the interior of the part.
Figure 3B:
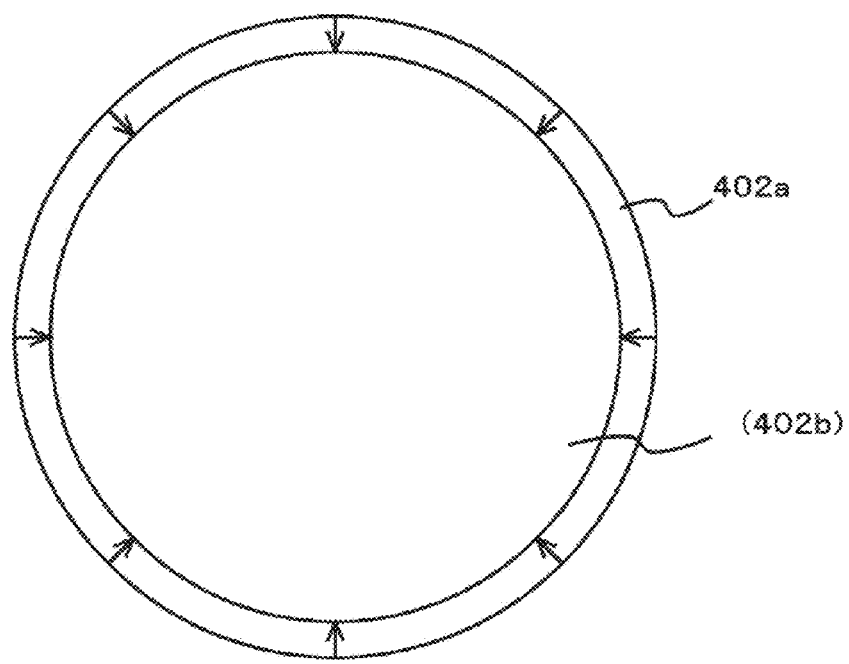

FIGS. 3A and 3B are views showing an example of a manner of setting color to a region corresponding to the interior of a part, and shows an example of a process performed on one piece of part data. FIG. 3A is a view showing one example of a manner of setting color performed in the present example, and shows one example of an operation in a case in which color is set with respect to a region 402a corresponding to one part 302a (see FIGS. 2A and 2B) in the shaped object data. In the present example, when setting color with respect to each piece of part data, the process is performed without considering the region corresponding to other part data. More specifically, in this case, with respect to a normal line at each position in the outer periphery of the part data, a position that collides with a normal line at another position (e.g., normal line extending from the opposite side in the outer periphery of the cross-section) is calculated. Then, the same color is set between each position in the outer periphery and this position (colliding position). Furthermore, the color is thus set to each position so as to extend to the interior of the part, so to speak, for the color set with respect to each position in the outer periphery. In this case, the manner of setting the color can also be considered as, for example, a method of forming color layers from the outer periphery of the part data to the position where the normal lines collide along the normal direction. With such a configuration, the color can be appropriately set for the interior of the portion corresponding to the part data based on the color set to the outer surface in each piece of part data.

Here, in the present example, the normal line at each position in the outer periphery of the part data is a straight line passing through each position and parallel to the normal direction at the relevant position. Furthermore, in this case, the normal direction at each position is a direction orthogonal to the outer periphery of the part data at each position and heading toward the interior of the shaped object. As can be seen from the above description, when setting colors through a method described with reference to FIG. 3A, the color is set with respect to the entire interior of the part.

However, in the shaped object data, for example, as in the case shown in FIG. 2A, other parts may exist inside one part. In this case, considering the relationship of the part data, a portion indicated by the part data of at least one part among the plurality of pieces of part data included in the shaped object data can also be considered as a portion surrounding the periphery of the portion indicated by another piece of part data. In this case, at the time of generating the slice data, the color ultimately needs to be set with respect to a region corresponding to each piece of part data, taking into consideration also the color of other parts included inside.

On the other hand, in the present example, for example, in the operation of generating one piece of slice data, each of the plurality of pieces of part data is selected in order and at the time of setting the color corresponding to the part data to be selected later, an overwriting process is performed on the already set color, thus setting the color with respect to the region corresponding to each piece of part data. According to the present example, for example, the color can be appropriately set to the region corresponding to each piece of part data. The color overwriting process will be described in more detail later.

Furthermore, it is conceivable to perform the setting of the color to the region corresponding to the interior of the part through a method different from the above. FIG. 3B is a view showing another example of the manner of setting colors, and shows a modified example of the operation in a case in which color is set with respect to the region 402a. As described above, in the case of the operation described with reference to FIG. 3A, the color is set with respect to the entire interior of the part. On the other hand, in the modified example, the color is set only with respect to a portion not overlapping with other parts in the interior of the part.

More specifically, in this case as well, the color is set to each position so as to extend to the interior of the part along the normal line at each position with respect to the color set for each position in the outer periphery. However, in this case, the range of setting the color is only the range up until colliding with a region corresponding to other part data (e.g., region 402*b* in the figure). In this case, for example, a range up until colliding with a region corresponding to another piece of part data is determined based on each piece of part data included in the shaped object data. Then, in the determined range, color is set along the normal line. In the case of such a configuration as well, for example, the color can be appropriately set with respect to a region corresponding to each piece of part data. The operation of the present modified example, for example, can be considered as an operation of setting the thickness of the color layer corresponding to the part data to be processed to an interval until colliding with another part (e.g., part to be selected next).

Figure 4A:
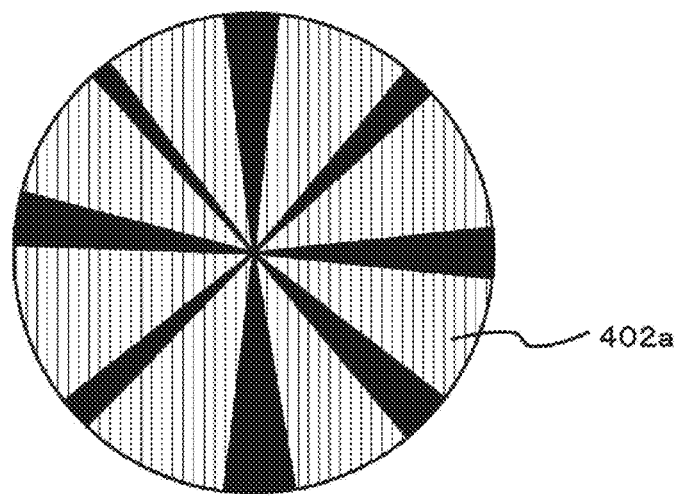
FIGS. 4A to 4C are views explaining an operation of setting colors to each region in one piece of slice data.
Figure 4B:
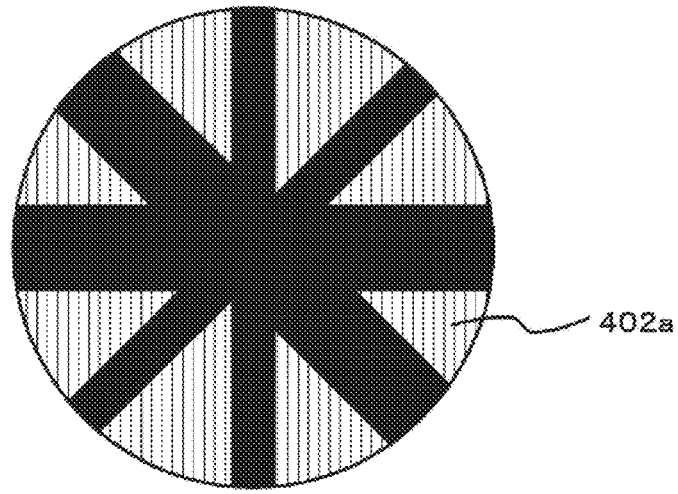
Figure 4C:
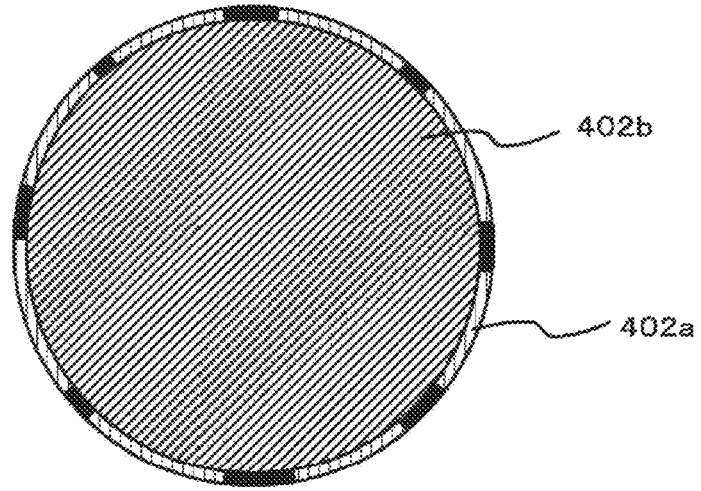
Figure 5:
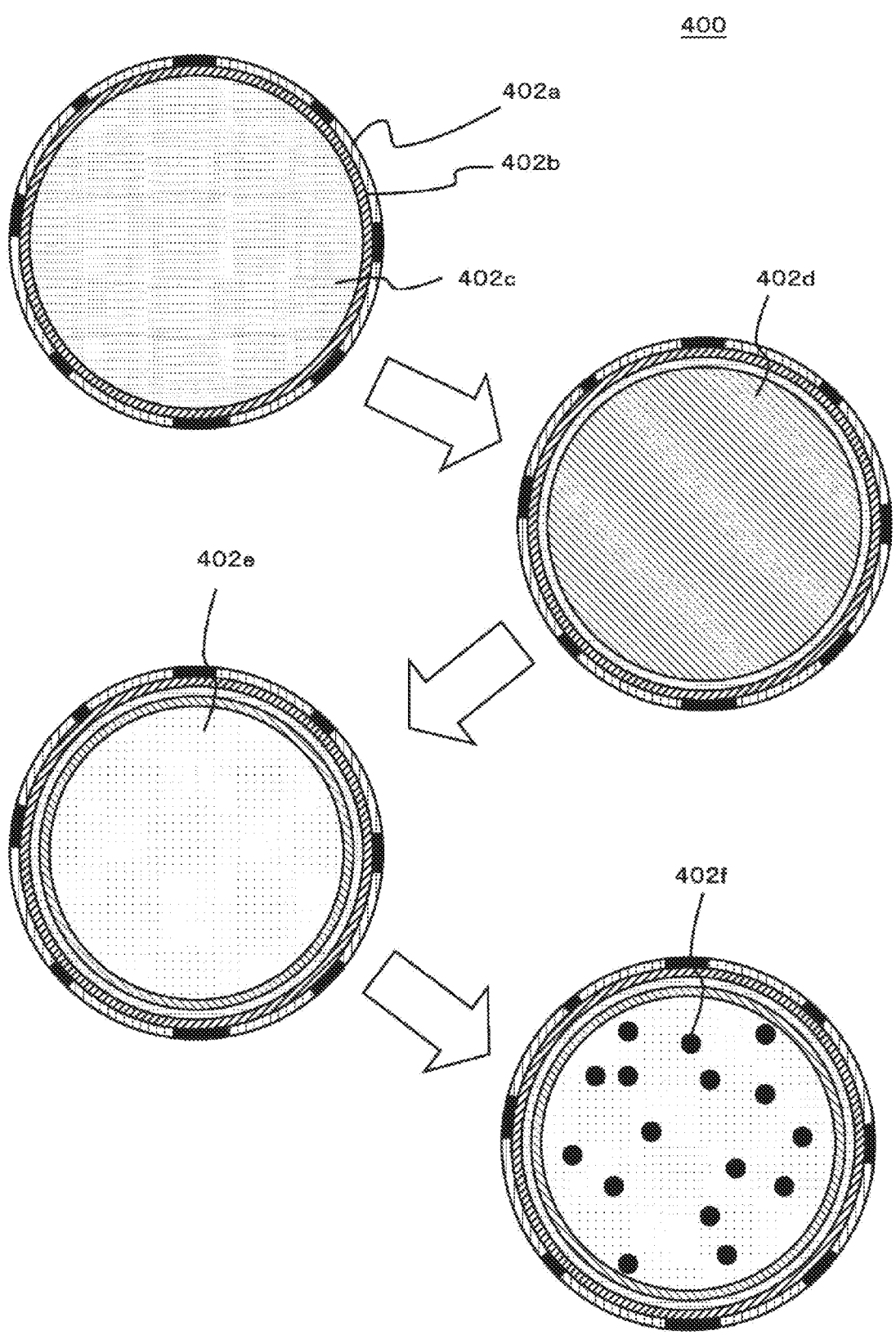
FIG. 5 is a view showing an example of an operation of setting colors to regions 402c to 402f.

Next, the operation of generating slice data in the present example will be described in more detail. FIGS. 4A to 4C and 5 are views explaining the operation of setting colors to each region (regions 402*a* to 402*f*) in one piece of slice data. FIGS. 4A to 4C are views explaining the operation of setting colors with respect to the regions 402*a* and 402*b*. FIG. 4A shows an example of an operation of setting colors to regions 402*a*. FIG. 4B shows a modified example of the operation of setting colors to the region 402*a*. FIG. 4C shows an example of the operation of setting colors to regions 402*b*. FIG. 5 shows an example of the operation of setting colors to the regions 402*c* to 402*f*.

As described above, in the present example, at the time of generating the slice data, each piece of part data included in the shaped object data is sequentially selected and a color is set with respect to a region corresponding to the part data. Furthermore, at the time of setting the color corresponding to the part data to be selected later, the color is set with respect to a region corresponding to each piece of part data by performing overwriting processing on the already set color.

In addition, in the present example, the order of selecting the part data is set in advance at the time of generating the shaped object data. More specifically, as described above, in the present example, the shaped object data 300 is generated or edited using the 3D CAD software having a layer function. Furthermore, data of a data format composed of a plurality of layers is used as the shaped object data. Moreover, in this case, for example, an order is set in advance to the plurality of layers in accordance with the order in which the layers are overlapped in the setting of the software.

Furthermore, in the present example, each piece of part data is generated in association with each layer constituting the shaped object data. In this case, regarding the manner of selecting the part data, the order is set in units of layers based on the order set for the layers. More specifically, in this case, at the time of generating the slice data, for example, the part data corresponding to each layer is selected in order by sequentially selecting the layers according to the set order. Then, the color of each position of the cross-section corresponding to the portion indicated by the part data associated with the selected layer is set. With such a configuration, each piece of part data can be appropriately selected in the order set, for example, at the time of generating shaped object data or the like. Furthermore, the color can be appropriately set based on each piece of part data.

In addition, in FIGS. 4A to 4C and 5, an example of the operation of selecting part data corresponding to the parts 302*a* to 302*f* in the shaped object data shown in FIG. 2A in the order of the alphabet given at the end of the reference numeral. In this case, color is set in the order corresponding to the above for the plurality of regions 402*a* to 402*f* forming the slice data shown in FIG. 2B. More specifically, in this case, among the plurality of regions 402*a* to 402*f*, the color is first set to the region 402*a*. In this case, for example, as in the operation described with reference to FIG. 3A, the color is set to each position so as to extend the color set to each position on the outer periphery in the part data corresponding to the region 402*a* to the interior of the part along the normal line. Furthermore, in this case, at the time point the setting of the color to each position of the region 402*a* is completed, a color is set at each position of the region 402*a*, for example, as shown in FIG. 4A.

Here, the result shown in FIG. 4A is an example in a case where the normal direction of each position on the outer periphery is calculated for each point forming the outer periphery. In this case, calculating the normal direction for each point forming the outer periphery means, for example, calculating the normal direction for each point lined at the minimum interval set according to the resolution of shaping. However, the normal direction is not necessarily calculated for each point, and for example, may be calculated for each preset interval. In this case, it is conceivable to use the same normal direction for points near the point where the normal direction is calculated. With such a configuration, for example, the color can be more easily set with respect to each region. Furthermore, in this case, the colors are set, for example, as shown in FIG. 4B to each position of the region 402*a*.

After setting the color with respect to the region 402*a*, the color is set with respect to the next region 402*b*. Furthermore, the color overwriting process is performed on one part of the region 402*a*. Furthermore, in this case, at the time point the setting of the color to each position of the region 402*b* is completed, the color is set at each position of the regions 402*a* and 402*b*, for example, as shown in FIG. 4C. Furthermore, after the color for the region 402*a* is set, the pieces of part data corresponding to the other regions are selected in order, and the color of each position of the cross-section corresponding to the portion indicated by the selected part data is set. In addition, as shown in FIG. 5, for example, the color is set to the regions 402*c* to 402*f* while sequentially performing the color overwriting process. According to the present example, at the time of generating the slice data, for example, the color overwriting process can be appropriately performed on the color set based on the previously selected part data based on the part data selected later. In addition, the color can be appropriately set with respect to each region of the slice data.

The operation described above, for example, can also be considered as operation of setting the same color to each position along the normal direction for a portion that is not overlapped with another piece of part data on the inner side among the portions indicated by respective pieces of part data. In this case, for example, if the part data indicating a portion surrounding the portion indicated by the other piece of part data is defined as outer data and the other piece of part data is defined as inner data, it can be considered that the same color is set to each position along the normal direction of the outer data with respect to the portion excluding the portion indicated by the inner data from the portion indicated by the outer data at the time of generating the slice data.

Figure 6:
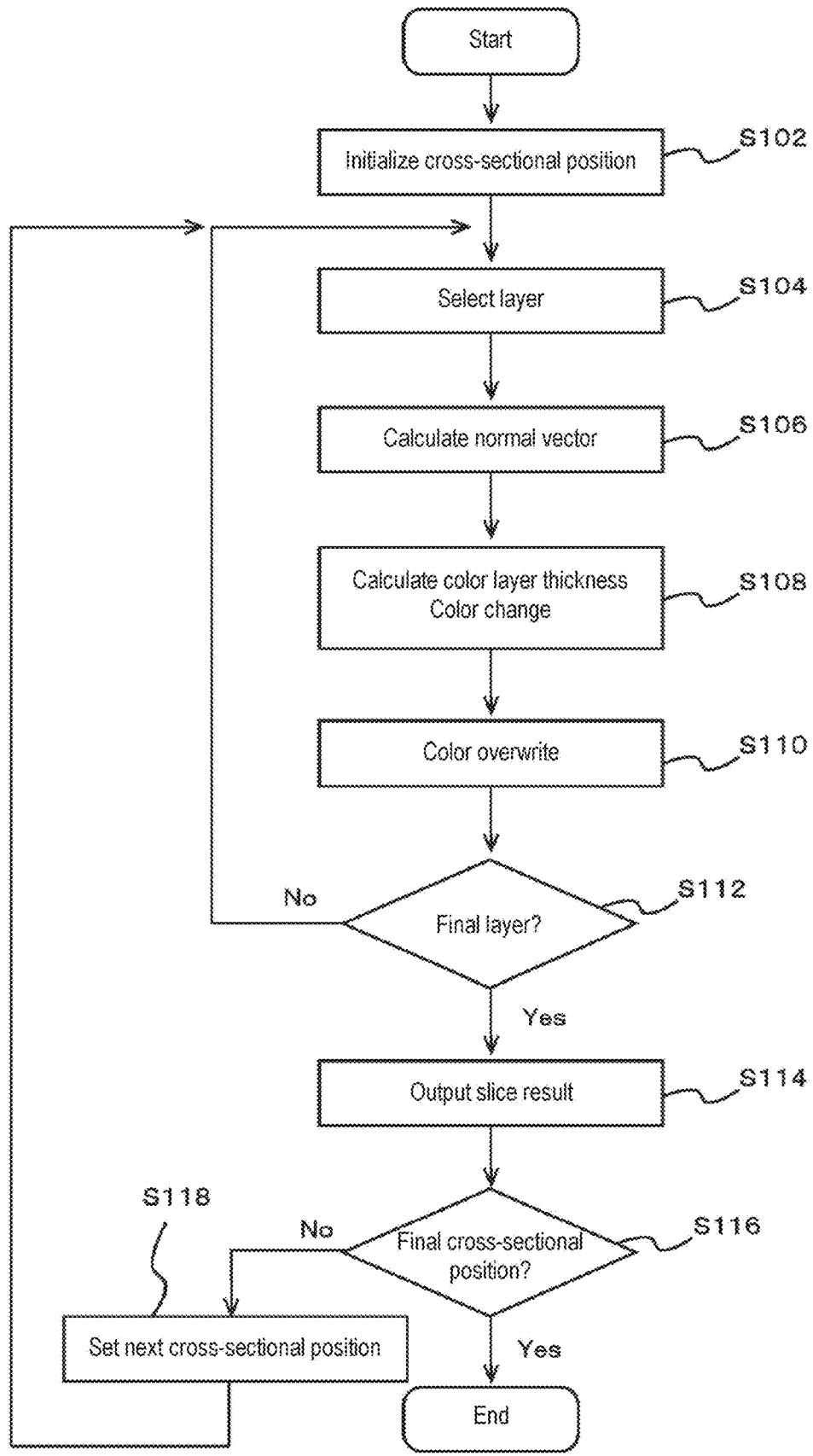
FIG. 6 is a flowchart showing an example of an operation of generating slice data.

Subsequently, the operation of generating slice data in the present example will be described in more detail with reference to a flowchart. FIG. 6 is a flowchart showing an example of an operation of generating slice data, and shows an example of an operation of generating slice data based on shaped object data by the controller 110 (see FIGS. 1A to 1C) in the shaping device 12. Furthermore, in the present example, the operation of generating the slice data by the controller 110 is an example of the operation of the slice data generating stage. The controller 110 generates a plurality of pieces of slice data, which indicate cross-sections of the shaped object at different positions from each other in the layering direction, by the operation to be described below.

More specifically, in the operation of generating the slice data, the controller 110 first sets the cross-sectional position corresponding to the first slice data by initializing the cross-sectional position (S102). The first slice data is the slice data to be generated first among the plurality of pieces of slice data. Furthermore, in the present example, the first slice data is, for example, slice data used at the time of forming the lowest portion of the shaped object. In this case, the cross-sectional position corresponding to the first slice data is, for example, the position on the lowermost side in the layering direction among the cross-sectional positions corresponding to each of the plurality of pieces of slice data.

After initializing the cross-sectional position, the first slice data is generated by performing color overwriting processing or the like as described above based on the shaped object data. In this operation, first, the first layer is selected based on the order set on the plurality of layers used in the shaped object data (S104). In this case, by selecting a layer, the part data corresponding to that layer is selected.

Then, with respect to the selected part data, the normal direction (normal vector) is calculated (S106) as described with reference to FIGS. 2A, 2B and 3 and the like, and calculation of the thickness of the color layer and color conversion are performed based on the calculated normal direction (S108). In this case, the calculation of the thickness of the color layer means, for example, calculating the position where the normal line collides as described above and determining a range of setting the same color along the normal direction. In addition, the color conversion means determining the color of each position of the region indicated by the selected part data based on the calculation result of the thickness of the color layer.

After the calculation of the thickness of the color layer and the color conversion are performed, the color overwriting process is performed to set the color to each position of the slice data being generated (S110). In this case, the color overwriting process is an operation of setting colors to regions corresponding to the selected part data of the range occupied by the slice data being generated based on the calculation result of step S108. In this case, the color overwriting process based on the part data selected first, for example, can be considered as a process of first setting the color with respect to the range occupied by the slice data being generated.

Furthermore, after the color overwriting process corresponding to the part data is completed, whether or not unprocessed part data is present/absent is checked (S112) by checking whether or not the layer corresponding to the relevant part data is the last layer (final layer). If unprocessed part data remains (S112: No), the process returns to step S104, and the next layer is selected based on the order set for the plurality of layers. In addition, by this, the part data to be processed next is selected. Subsequently, the operations of steps S106 to S110 are repeated based on the selected part data, so that color is set for the regions corresponding to the relevant part data in the slice data. In step S112, the presence/absence of unprocessed part data is checked again, and the above operations are repeated until the process corresponding to all pieces of part data is completed, if necessary. With such a configuration, for example, the setting of the color based on each piece of part data can be appropriately carried out.

Here, as also described above, the color overwriting processing based on the part data selected first, for example, can be considered as a process of first setting the color with respect to the range occupied by the slice data being generated. On the other hand, in the case of the part data selected second or thereafter, the color overwriting processing, for example, can be considered as a process of changing the color set in the previous process, and the like with respect to the range occupied by the slice data being generated. In this case, changing the color set in the previous process, for example, may be changing the color with respect to at least a part of the range occupied by the slice data being generated. More specifically, at the time of generating the slice data, for example, when setting the color of interior of the portion indicated by the outer data in the relation between the outer data which is part data indicating the portion surrounding the periphery of the portion indicated by another piece of part data (inner data) and the inner data, the color is also set based on the color set with respect to the outer surface of the portion indicated by the outer data to the portion indicated by the inner data by the color overwriting process based on the outer data. In this case, thereafter, in the case of setting the color of the interior of the portion indicated by the inner part data, the overwriting process of changing the color set at the time of setting the color of the interior of the portion indicated by the outer data is performed on the color of the interior corresponding to the inner part data. According to the present example, for example, the color of the interior of the portion indicated by each piece of part data can be appropriately set based on the color set for the outer surface. Furthermore, for example, the color of each position of the cross-section corresponding to the portion indicated by each piece of part data thus can be appropriately set.

If determined in step S112 that the layer corresponding to the part data processed immediately before is the last layer (final layer) (S112: Yes), the result (slice result) of the process corresponding to the cross-sectional position set at the time is output to generate the slice data corresponding to the relevant cross-sectional position (S114). Furthermore, in step S114, for example, it is conceivable to generate the slice data by further performing necessary process such as RIP process, as necessary. In this case, it is considered that the RIP process or the like be performed in the same manner as or similarly to the known operation for generating the slice data. It is also considered that the RIP process and the like, for example, be separately performed after each of the above-described processes is performed on all the cross-sectional positions.

After generating the slice data corresponding to the set cross-sectional position, whether or not the cross-sectional position set at that time is the final cross-sectional position is checked (S116). In this case, the final cross-sectional position is the cross-sectional position corresponding to the slice data generated last. Then, if the cross-sectional position set at that time is not the final cross-sectional position (S116: No) and there still exists slice data that has not yet been generated, the cross-sectional position corresponding to the slice data to be generated next is set (S118). The next slice data is generated by repeating the operations after step S104.

If determined in step S116 that the cross-sectional position set at that time is the final cross-sectional position (S116), the operation of generating the slice data is terminated. According to the present example, a plurality of pieces of slice data can be appropriately generated based on the shaped object data. For example, data indicating a cross-section of a shaped object in which the interior is colored can be appropriately generated for the slice data. In this case, the shaped object in which the interior is colored is, for example, a shaped object in which the interior of the portion indicated by the part data is colored. Further, in this case, for example, the shaped object in which the interior is colored can be appropriately shaped by performing the shaping operation based on the slice data in the shaping device 12.

Next, supplementary explanation on the configuration described above, explanation of modified examples and the like will be made. As described above, in the present example, at the time of generating the slice data, the color is set to each position so as to extend, so to speak, the color set to each position on the outer periphery of the portion corresponding to the part data to the interior of the part. Furthermore, the color is set to each position in the range occupied by the slice data by performing the color overwriting processing as described above based on the part data selected in order. Such process, for example, can be considered as generating the slice data so as not to form gaps between the parts by performing a process of giving an appropriate thickness to the outer periphery of the parts corresponding to each piece of part data at the time of generating the slice data of each position in the layering direction. Moreover, such process, for example, can also be considered as a process of complementing the color between the outer surfaces of the parts by setting the color with respect to a space between the outer surfaces of the parts indicated by the respective pieces of part data.

In this case, it can be considered that the thickness of the outer periphery of the part (thickness of color layer) is spread toward the inner direction of the curved surface specifying the shape of the outer surface of each part. In this case, for example, it is conceivable to use data in which the inner direction and the outer directions at each cross-sectional position to generate the slice data are determined as the part data. In this case, for example, it is also conceivable to preset inner and outer directions with respect to a curved surface constituting the outer surface in each piece of part data. Furthermore, the inner direction and the outer direction corresponding to the part data may be determined according to, for example, the shape indicated by the part data. More specifically, as part data, for example, it is conceivable to use data in which the curve appearing at the cross-sectional position corresponding to the slice data in correspondence with the curved surface constituting the outer surface of the part is a closed curve (endless curve such that it connects by one round). In this case, regarding the inner direction and the outer direction, a direction directed toward the interior of the closed curve can be considered as the inner direction and a direction directed toward the exterior can be considered as the outer direction.

Furthermore, as described above, in the present example, each piece of part data is managed in association with a layer. In this case, for example, more part data can be used by increasing the number of layers to use (number of layering). This also makes it possible to, for example, express (reproduce) the interior (contents) and the like of the shaped object in more detail.

In addition, in the present example, a shaped object in which the interior is colored is shaped by shaping a shaped object in the shaping device 12 based on the slice data described above. In this case, as described with reference to FIGS. 1A to 1C and the like, each part of the shaped object 50 is formed using ink of each color of Y, M, C and K and ink of white color. Furthermore, in this case, the ink of each color is not limited to ink dedicated (ink dedicated for bulk color shaping) for the case of coloring the interior, and for example, ink same as or similar to the ink used when coloring only the surface of the shaped object 50 can be used. In this case, in the shaping device 12, the shaped object in which the interior is colored is not the only case, and a shaped object in which only the surface is colored may be further shaped. In this case, the shaped object in which only the surface is colored refers to, for example, a shaped object in which a colored region is formed in a region where the hues can be visually recognized from the outside, and a light reflecting region is formed on the inner side of the colored region. Furthermore, in this case, for example, it is conceivable to form the colored region with a preset thickness using ink of each color of Y, M, C and K and clear ink. Moreover, it is conceivable to form the light reflecting region using white ink. With such a configuration, a variety of shaped objects can be appropriately shaped in the shaping device 12.

Furthermore, in a modified example of the configuration of the shaping device 12, it is also conceivable to use ink having characteristics that match more with the case of coloring the interior of the shaped object. In this case, it is conceivable to use an ink containing a white coloring material in addition to the coloring material of each color as a color ink for coloring (ink of each color of Y, M, C, K etc.). In this case, the coloring material same as or similar to the coloring material (pigment) for the white ink can be suitably used as the white coloring material.

In the above description, the operation in the case of selecting the part data according to the order of the layer has been described with respect to the method of sequentially selecting the part data at the time of generating the respective pieces of slice data. Furthermore, in a modified example of the manner of selecting the part data, for example, it is conceivable to select the part data based on matters other than the order of layers. As such a method, for example, it is conceivable to automatically determine the order of selecting the part data based on the position of the parts indicated by the respective pieces of part data. More specifically, in this case, for example, it is conceivable to select the plurality of pieces of part data included in the shaped object data in order from the part data located on the outer side. In this case, the part located on the outer side is, for example, a part located at a position closer to the outer surface of the shaped object. In this case, for example, the part data indicating the portion surrounding the periphery of the portion indicated by another piece of part data is selected before the other piece of part data. Even in such a configuration, for example, each piece of part data can be appropriately selected according to a certain rule. In addition, in this case, the order of selecting the parts may not be set in advance before starting the generation of the slice data, and the order may be determined at the time of generating the slice data based on the positional relationship of the parts indicated by the respective pieces of part data.

Furthermore, in the above description, regarding the operation of generating the slice data corresponding to the shaped object in which the interior is colored, the description has been made on a process (coloring process) of setting the color of each position in the cross-section in the operation of generating the slice data corresponding to each cross-sectional position. However, in a modified example of the operation of generating the slice data, for example, consideration is made to perform the coloring process collectively on the entire shaped object data, and perform slice process on the data (processed 3D data) indicating the shaped object in the state after the coloring process to generate a plurality of pieces of slice data, or the like.

Figure 7:
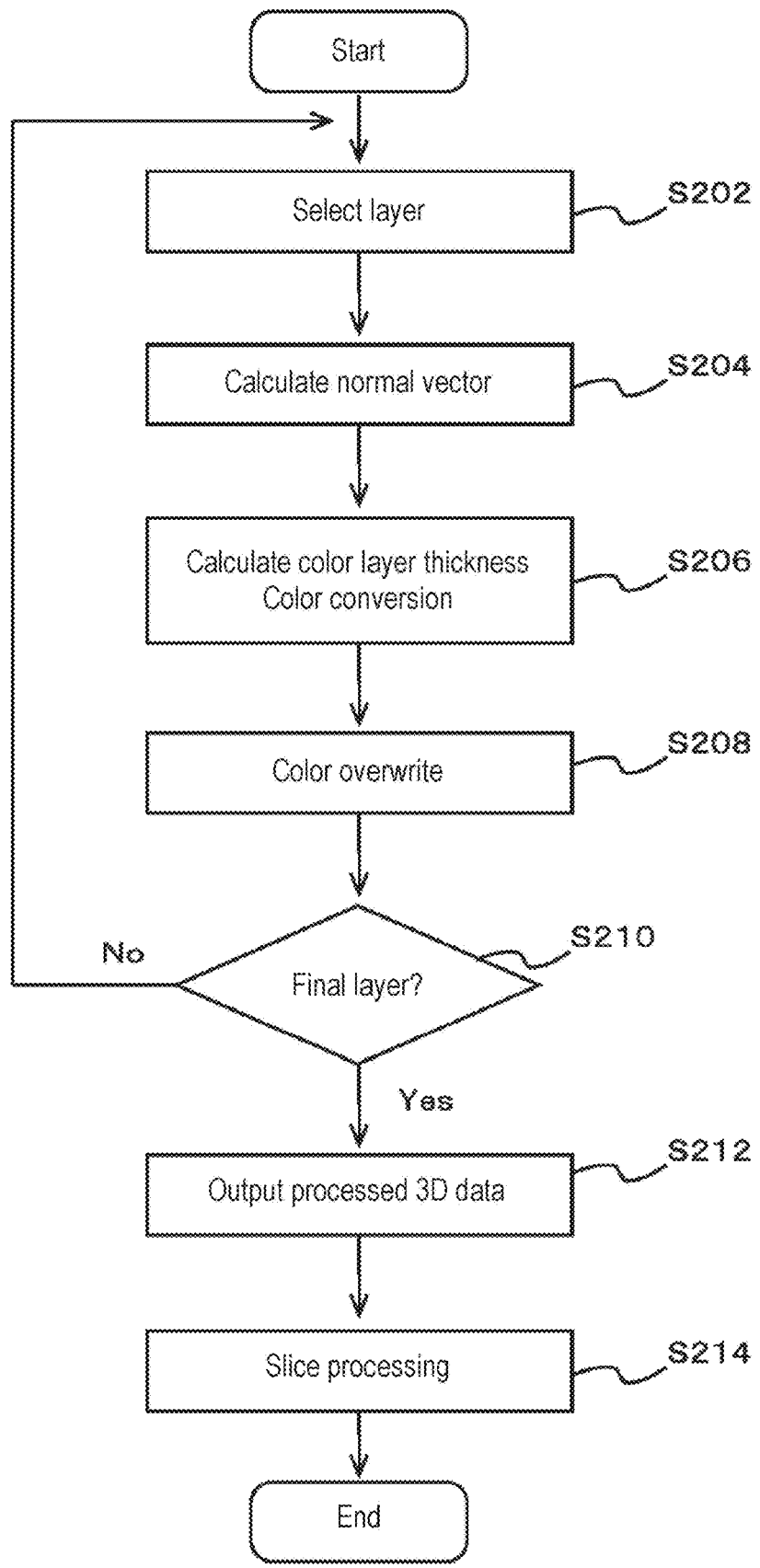
FIG. 7 is a flowchart showing a modified example of an operation of generating slice data.

FIG. 7 is a flowchart showing a modified example of the operation of generating the slice data, and shows an example of the operation in the case where the colorization process is collectively performed on the entire shaped object data. In the present modified example, the controller 110 performs the coloring process on the entire shaped object indicated by the shaped object data before the process of setting the cross-sectional position and performing the process for each cross-sectional position.

More specifically, in this case, the first layer is first selected based on the order set for the plurality of layers used in the shaped object data (S202). The part data corresponding to the layer is thereby selected. Then, a normal direction (normal vector) is calculated for each position on the outer surface of the part indicated by the selected part data (S204). In addition, in this case, unlike the operation in step S106 in the flowchart shown in FIG. 6, the normal direction is directly calculated with respect to the curved surface showing the outer surface shape of the stereoscopic part. Therefore, the normal direction at each position may be a direction different from the normal direction calculated by the operation of step S106 in the flowchart shown in FIG. 6.

Furthermore, in the modified example, the thickness of the color layer is calculated and color conversion is performed based on the calculated normal direction (S206). In this case as well, unlike the operation in step S108 in the flowchart shown in FIG. 6, these processes are directly performed on the entire curved surface indicating the outer surface shape of the stereoscopic part. Moreover, the color of each position in the interior is set for the entire part.

Following these processes, the color overwriting processing corresponding to the selected part data is performed (S208). In this case, an operation of setting the color of each position in the range occupied by the part with respect to the entire shaped object can be considered for the color overwriting process. Furthermore, after the color overwriting process corresponding to the part data is completed, whether or not unprocessed part data is present/absent is checked (S210) by checking whether or not the layer corresponding to the relevant part data is the last layer (final layer). If unprocessed part data remains (S210: No), the process returns to step S202, and the next layer is selected based on the order set for the plurality of layers. In addition, by this, the part data to be processed next is selected. Subsequently, the color is set to the region corresponding to each piece of part data by repeating the operations of steps S204 to S208 based on the selected part data. In step S210, the presence/absence of unprocessed part data is checked again, and the above operations are repeated until the process corresponding to all part data is completed, if necessary.

If determined in step S210 that the layer corresponding to the part data processed immediately before is the last layer (final layer) (S210: Yes), the results of the processes up to that point are output to output processed 3D data which is data indicating the result of performing the coloring process on the shaped object data (S212). Then, the slice process is performed on the processed 3D data to generate a plurality of pieces of slice data (S214).

Here, in the present modified example, for example, it is conceivable to use data in which colors are set for all positions constituting the shaped object can be used as the processed 3D data. In this case, it is conceivable that the data amount of the processed 3D data becomes considerably large. However, as is apparent from the above description, the processed 3D data is data temporarily used in a series of operations for generating the slice data. In such a case, even if data having a large data amount is used, a large problem hardly occurs. Furthermore, in this case, in the slicing process performed in step S214, the slice data indicating the color or the like of the interior of the shaped object can be easily and appropriately generated by slicing the processed 3D data as it is. As described above, in the present modified example as well, the slice data to be used in the case of shaping a shaped object in which the interior is colored can be appropriately generated. This also makes it possible, for example, to appropriately shape a shaped object in which the interior is colored. Furthermore, in the present modified example, the coloring process collectively performed on the entire shaped object data, for example, can be considered as an operation of setting the color of the interior of the portion indicated by the part data based on the color set for the outer surface. Furthermore, considering the coloring process together with the operation of the slice process to be performed later, for example, it can be thought that the operation of setting the color of each position of the cross-section corresponding to the part indicated by each piece of part data or the like.

INDUSTRIAL APPLICABILITY

The present disclosure can be suitably used in, for example, a shaping method.

What is claimed is:
1. A shaping method for shaping a shaped object which is stereoscopic, and the shaping method comprising:
   a shaped object data preparing step of preparing a shaped object data which is data indicating the shaped object to be shaped;
   a slice data generating step of generating a slice data which is data indicating a cross-section of the shaped object based on the shaped object data, a plurality of pieces of the slice data indicating cross-sections of the shaped object at different positions being generated; and
   a shaping step of shaping the shaped object based on the plurality of pieces of the slice data;
   wherein
   in the shaped object data preparing step, the shaped object data including a plurality of pieces of part data, each of which is data indicating a part of the shaped object, is prepared;
   a portion indicated by the part data of at least one part of the plurality of pieces of part data included in the shaped object data is a portion surrounding a periphery of a portion indicated by another piece of part data;
   each piece of the part data is data indicating at least an outer surface shape of a portion indicated by the part data and a color to be colored on the outer surface of the portion; and
   in the slice data generating step, the slice data indicating a cross-section of the shaped object is generated by setting the color of each position of the cross-section corresponding to a portion indicated by each piece of the part data, and
   a color of an interior of the portion indicated by each piece of the part data is set based on a color set for the outer surface;
   wherein each of the plurality of pieces of the part data has a different texture from each other, and the plurality of pieces of the part data is combined to obtain the shaped object data.

2. The shaping method according to claim 1, wherein
in the shaping step, a shaping material of a plurality of colors different from each other is ejected based on the slice data from a head portion that ejects the shaping material of a plurality of colors to shape the shaped object in which at least a part of the interior of the portion indicated by the part data is colored.

3. The shaping method according to claim 1, wherein
in the slice data generating step, a normal direction at each position on an outer periphery of the cross-section corresponding to the portion indicated by each piece of the part data is calculated, and
a same color is set to each position along the normal direction for at least a vicinity of the outer periphery of the portion indicated by the part data.

4. The shaping method according to claim 2, wherein in the slice data generating step, a normal direction at each position on an outer periphery of the cross-section corresponding to the portion indicated by each piece of the part data is calculated, and
a same color is set to each position along the normal direction for at least a vicinity of the outer periphery of the portion indicated by the part data.

5. The shaping method according to claim 3, wherein
when the part data indicating a portion surrounding a portion indicated by an other piece of part data is defined as an outer data and the other piece of part data as an inner data,
the same color is set with respect to each position along the normal direction of the outer data with respect to a portion excluding a portion indicated by the inner data from a portion indicated by the outer data in the slice data generating step.

6. The shaping method according to claim 4, wherein
when the part data indicating a portion surrounding a portion indicated by an other piece of part data is defined as an outer data and the other piece of part data as an inner data,
the same color is set with respect to each position along the normal direction of the outer data with respect to a portion excluding a portion indicated by the inner data from a portion indicated by the outer data in the slice data generating step.

7. The shaping method according to claim 1, wherein in the slice data generating step, the slice data is generated so that a shaping material is filled without gaps in the shaping step between the portions indicated by respective pieces of part data by setting the color of the interior of the portion indicated by the pieces of part data.

8. The shaping method according to claim 1, wherein
in the shaped object data preparing step, the shaped object data in a data format composed of a plurality of layers is prepared;
the plurality of layers are ordered in advance;
each piece of the part data is associated with any one of the layers; and
in the slice data generating step, each of the plurality of layers is selected in an order set in advance, and the color of each position of the cross-section corresponding to the portion indicated by the part data associated with the selected layer is set.

9. The shaping method according to claim 1, wherein
in the slice data generating step, a plurality of pieces of part data included in the shaped object data are sequentially selected, and a color of each position of a cross-section corresponding to a portion indicated by the part data that is selected is set; and
the part data indicating the portion surrounding a periphery of a portion indicated by the other piece of part data is selected before the other piece of part data.

10. The shaping method according to claim 1, wherein
in the slice data generating step,
when setting a color of an interior of a portion indicated by an outer data which is the part data indicating the portion surrounding a periphery of a portion indicated by the other piece of part data, the color is set based on a color set to the outer surface of the portion indicated by the outer data also for the part indicated by the other piece of part data; and
when setting a color of an interior of a portion indicated by the other piece of part data, the color is set for the interior based on a color set to the outer surface of the portion indicated by the other piece of part data by performing an overwriting process of changing the color set at the time of setting the color of the interior of the portion indicated by the outer data.

11. The shaping method according to claim 1, wherein
the part data is data in which color is not set for the interior of the portion indicated by the part data.

12. The shaping method according to claim 1, wherein
in the part data, colors to be applied to the outer surface are set by a texture mapping.

13. A slice data generating method for generating a slice data which is data indicating a cross-section of a shaped object which is stereoscopic, and the slice data generating method comprising:
a shaped object data preparing step of preparing a shaped object data which is data indicating the shaped object to be shaped; and
a slice data generating step of generating the slice data based on the shaped object data, a plurality of pieces of the slice data indicating cross-sections of the shaped object at different positions being generated;
wherein
in the shaped object data preparing step, the shaped object data including a plurality of pieces of part data, each of which is data indicating a part of the shaped object, is prepared;
a portion indicated by the part data of at least one part of the plurality of pieces of part data included in the shaped object data is a portion surrounding a periphery of a portion indicated by another piece of part data;
each piece of the part data is data indicating at least an outer surface shape of a portion indicated by the part data and a color to be colored on the outer surface of the portion; and
in the slice data generating step, the slice data indicating a cross-section of the shaped object is generated by setting the color of each position of the cross-section corresponding to a portion indicated by each piece of the part data, and
a color of an interior of the portion indicated by each piece of the part data is set based on a color set for the outer surface;
wherein each of the plurality of pieces of the part data has a different texture from each other, and the plurality of pieces of the part data is combined to obtain the shaped object data.

* * * * *